US012667218B2

(12) United States Patent
Stark

(10) Patent No.: US 12,667,218 B2
(45) Date of Patent: Jun. 30, 2026

(54) ESPRESSO EASY RELEASE FILTER

(71) Applicant: Sunbeam Products, Inc., Atlanta, GA (US)

(72) Inventor: Lauren Stark, Delray Beach, FL (US)

(73) Assignee: Sunbeam Products, Inc., Atlanta, GA (US)

( * ) Notice: Subject to any disclaimer, the term of this patent is extended or adjusted under 35 U.S.C. 154(b) by 357 days.

(21) Appl. No.: 18/256,249

(22) PCT Filed: Dec. 14, 2021

(86) PCT No.: PCT/US2021/063204
§ 371 (c)(1),
(2) Date: Jun. 7, 2023

(87) PCT Pub. No.: WO2022/132695
PCT Pub. Date: Jun. 23, 2022

(65) Prior Publication Data
US 2024/0016330 A1 Jan. 18, 2024

Related U.S. Application Data

(60) Provisional application No. 63/125,744, filed on Dec. 15, 2020.

(51) Int. Cl.
*A47J 31/06* (2006.01)

(52) U.S. Cl.
CPC ....... *A47J 31/0626* (2013.01); *A47J 31/0663* (2013.01)

(58) Field of Classification Search
CPC .......................... A47J 31/0626; A47J 31/0663
See application file for complete search history.

(56) References Cited

U.S. PATENT DOCUMENTS

2016/0309943 A1    10/2016  Rijskamp et al.

FOREIGN PATENT DOCUMENTS

| | | | | |
|---|---|---|---|---|
| CN | 202714726 U | | 2/2013 | |
| EP | 88335 A1 | | 9/1983 | |
| EP | 2918197 A1 | | 9/2015 | |
| GB | 2505041 A | * | 2/2014 | .......... A47J 31/4464 |
| KR | 1020070110020 A | | 11/2007 | |
| KR | 10-2015-0017541 | * | 2/2015 | ............. A47J 31/36 |
| KR | 20150017541 A | | 2/2015 | |
| KR | 1020150017541 A | | 2/2015 | |

OTHER PUBLICATIONS

KR 10-2015-0017541_English translation (Year: 2015).*
Extended European Search Report issued in corresponding European Serial No. 21907594.2 on Aug., 21, 2024.

* cited by examiner

*Primary Examiner* — Youngsul Jeong
(74) *Attorney, Agent, or Firm* — Husch Blackwell LLP

(57) ABSTRACT

An easy release filter for espresso brewing is provided. The easy release filter comprises a portafilter having a circumferential recessed groove within its interior wall. A spring may be placed and secured into the recessed groove. The spring is preferably controllable, for example by a tab member, to either of an open or closed position. When toggled to the closed position, added tension can cause the spring to bend or flex into the interior of the portafilter to secure a filter basket therein. When in the open position, the spring may retract into the recessed groove so that the filter basket may easily be removed from the portafilter.

10 Claims, 2 Drawing Sheets

ESPRESSO EASY RELEASE FILTER

CROSS-REFERENCE TO RELATED APPLICATIONS

This Application claims priority to U.S. Provisional Patent Application Ser. No. 63/125,744, filed on Dec. 15, 2020, entitled "ESPRESSO EASY RELEASE FILTER," the entire disclosure of which is incorporated herein by reference.

FIELD OF THE INVENTION

The present invention is generally directed to an improved mechanism for releasing and securing a filter basket in a portafilter used to brew espresso.

BACKGROUND

As is known in the art, brewing espresso involves forcing hot water, under high pressure, through finely ground compacted coffee beans. Such coffee grounds are contained in a basket of a portafilter. Water is then forced at high pressures through the portafilter and coffee grounds contained therein. Performing the compacting process using coffee grounds under high pressure leaves tightly compacted, wet coffee grounds in a basket of the portafilter. For a subsequent use, a consumer must remove those same wet grounds. Most often, a consumer does so by banging or striking the portafilter upside down over a trash can.

Unfortunately, sometimes the filter basket in the portafilter is too loose and falls into the trash can along with the coffee grounds. This can be not only frustrating, but also messy.

One attempt to solve this problem includes using multiple springs for holding the filter basket in place until it needs to be removed for cleaning. However, this method is prone to compressing the filter basket too tightly to the portafilter, making it difficult to remove the filter basket for a thorough cleaning after use. Other attempts to solve this problem include the use of external securing mechanisms on the portafilter, or additional components used within the portafilter to secure the filter basket in place. However, such external and additional items require additional storage space, make the portafilter harder to operate, and/or introduce additional parts in need of cleaning.

Accordingly, there exists a need for a portafilter for espresso makers that can securely hold the filter basket in place, without holding the filter basket so tightly that removing it is overly difficult for an operator.

SUMMARY OF THE INVENTION

The present invention is directed to a system for releasably, yet simply, coupling a filter basket to a portafilter for use with an espresso coffee maker. The system generally includes a portafilter with a handle for easy use and manipulation. The portafilter may further comprise a circumferential recessed groove located in an interior of the portafilter. The recessed groove may be defined along the entire interior circumference, or alternatively, may stop at a point prior to making a completed loop. A spring may be adapted for placement in the groove, and the spring may (in at least one embodiment) similarly feature a terminal point such that the spring is not a complete loop.

The portafilter also may include an opening at a rear portion thereof. The opening may be used to receive a tab or tactile touch point that is coupled to the spring. The tab may be manipulated by an operator to manipulate the spring to couple, or uncouple, the filter basket to or from the portafilter. When a filter basket is initially placed in the portafilter, the tab spring may be located substantially within the recessed groove with the tab in a first position. When an operator wishes to securely couple the basket to the portafilter, he or she may slide the tab to a second position, causing the spring to compress inwardly toward the filter basket and the interior of the portafilter. The tension in the spring causes an interference fit between the spring and the filter basket thereby securing the filter basket within the portafilter. The tension keeps the filter basket in place during use and when the portafilter is removed to empty the used grounds.

To empty the used grounds, a user may bang the portafilter against a trash can without fear of the basket falling into the trash. Alternatively, he or she may slide the tab back to the first position and release the tension in the spring such that the filter basket may then easily be removed from the portafilter and cleaned for a subsequent use.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DETAILED DESCRIPTION OF THE INVENTION

Figures 1, 2:
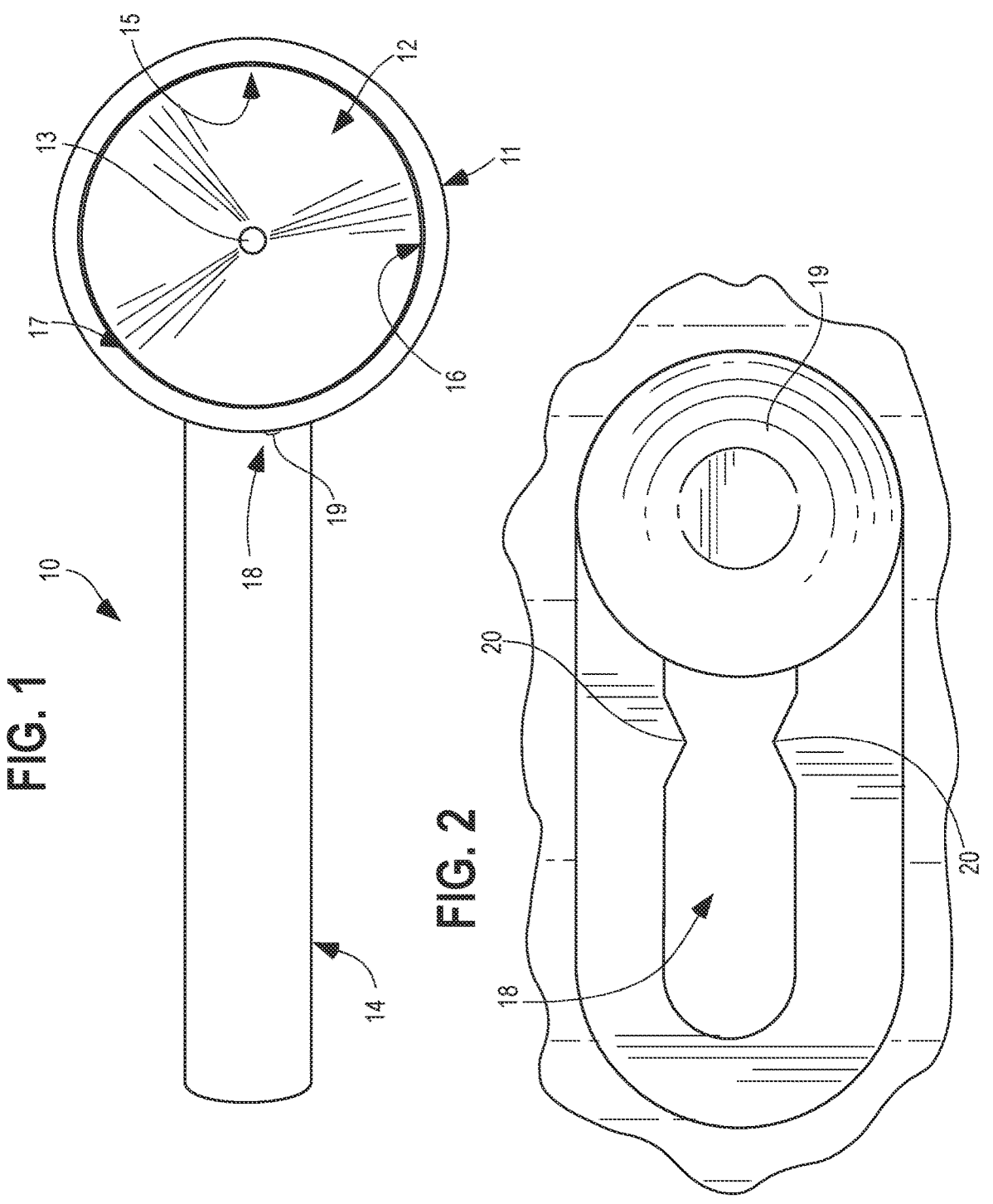
FIG. 1 is a top plan view of an espresso easy release filter in an open position in accordance with one embodiment of the present invention.
FIG. 2 is a rear elevation view of an adjustable toggle point of an espresso easy release filter in an open position in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed to a system for emptying a filter basket of an espresso portafilter, in a manner that prevents or reduces the likelihood of the filter basket located within the portafilter falling out. The present invention may be compatible with any known espresso machines or makers that are currently known or espresso machines that have yet to be designed, manufactured, or may otherwise become available in the future. Accordingly, the present invention may be compatible with other beverages types, including without limitation tea, coffee, or other beverages utilizing pressure filtration systems.

Turning first to FIG. 1, the invention hereof is an improved easy release filter 10 that can be used during the espresso brewing process. As understood in the art, the easy release filter 10 may be designed in accordance with any known or foreseeable specifications for portafilter for use with espresso makers. As illustrated, the easy release filter 10 includes a portafilter 11 having a cavity 12 in which a filter basket (not illustrated) may be received. The filter basket may be filled with coffee grounds when ready for use with an espresso maker.

As illustrated, the portafilter 11 is generally cylindrical or circular; however, other geometric shapes are within the scope of the present invention. The portafilter 11 may have a generally solid bottom with a defined opening or drip hole 13 (such as is known in the art) through which brewed beverage may drip after passing over the grounds in the filter basket. To help a user operate use the portafilter 11, a handle or stem 14 may extend outwardly from the portafilter 11.

The portafilter 11 may further comprise a recess or groove 15 defined or otherwise located in its cavity 12. As best illustrated by FIG. 1, the groove 15 may be formed as a generally circumferential recess that recesses radially outwardly into an inner wall defining the cavity 12, away from the hole 13. In one embodiment, the groove 15 may extend the entire inner circumference of portafilter 11, but in alternative embodiments, may terminate at an earlier point.

A spring 16 is preferably received and retained within the groove 15. The spring 16 may utilize any known method or apparatus for the storing of elastic potential energy. The spring 16 may be of a size and shape that generally conforms to the size and shape of the portafilter 11, and more particularly the groove 15. In one embodiment, it may comprise a generally circular shape.

In the illustrated embodiment, the spring 16 includes a terminal point 17 such that the spring 16 does not form a closed loop. Put another way, the spring 16 may have a gap between its starting point and the terminal point 17 such that the spring 16 is an incomplete circle (or other shape, in alternative embodiments). The terminal point 17 may be fitted or otherwise in connection with a terminal end of the groove 15 or may alternatively be in contact with a tab or other object positioned in the groove 15. It will be appreciated that in alternate embodiments of the present invention, the spring 16 could comprise a closed loop, with no terminal point 17.

The portafilter 11 may further comprise an opening 18 extending through the surface of the portafilter 11. In one embodiment, the opening 18 may be positioned such that it is generally aligned with the handle 14, where the handle 14 begins extending rearwardly from the portafilter 11. However, in other embodiments, the opening 18 may be positioned at any point along the circumference of portafilter 18.

The opening 18, which is illustrated in greater detail in FIG. 2, may be of any geometric shape, including circular, ovular, triangular, rectangular, or other polygonal shape. Further, the opening 18 may be positioned above the handle 14. However, in other embodiments, the opening 18 may be positioned below, or even with, the handle 14.

The spring 16 preferably includes a tab member 19 located at a starting point of the spring 16. When the spring 16 is positioned in the groove 15, the tab 19 may extend at least partially through the portafilter 11 via the opening 18. In this position, the spring 16 may be "at rest" and "locked in place" within the groove 15. As described below, when an operator toggles the tab member 19 from side to side, the spring 16 may flex inwardly and outwardly to retain and release, respectively, a filter basket contained within the portafilter 11.

Figures 3, 4:
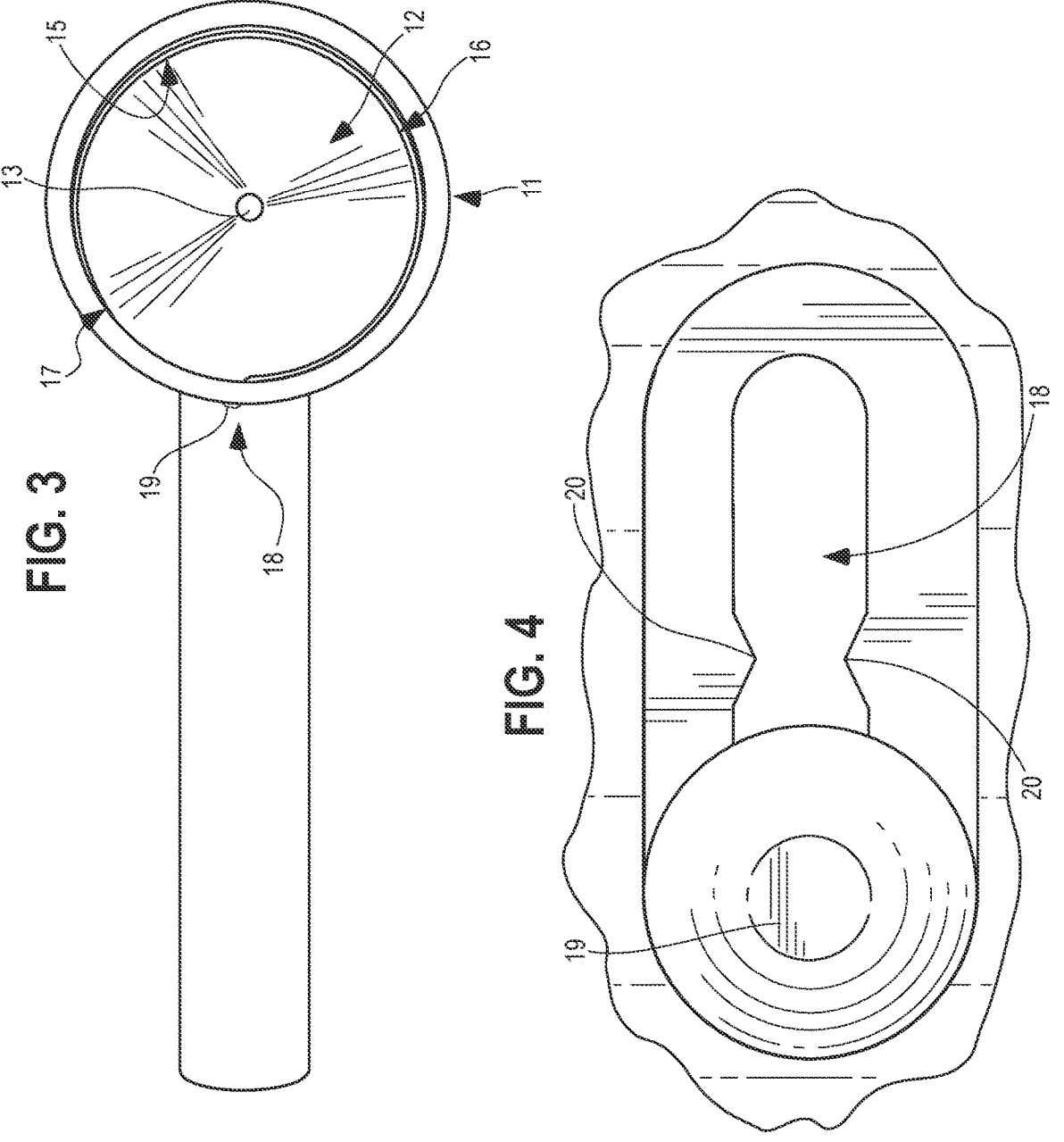
FIG. 3 is a top plan view of an espresso easy release filter in a closed position in accordance with one embodiment of the present invention.
FIG. 4 is a rear elevation view of an adjustable toggle point of an espresso easy release filter in a closed position in accordance with one embodiment of the present invention.

The opening 18 may comprise at least one notch member 20 that operates to keep the tab member 19 on one side or the other of the opening 18 after a user has placed the tab member 19 on one side. The notch member 20 may vary in design and may be of any geometric shape. In the illustrated embodiment, it is generally triangular in shape. In the illustrated embodiment, the opening IS includes two corresponding notch members 20, with one positioned on the top portion of opening 18 and one positioned on the bottom portion of opening 18. The notch members 20 may retain the tab member 19 on one side or the other of the opening 18 and thus keep the spring 16 positioned in the recess of groove 15 (as illustrated in FIGS. 1 and 2) in the "open" position, or pull the spring 16 inwardly from the groove 15 (as illustrated in FIGS. 3 and 4) to the "closed" position. The tab member 19 is preferably retained in the opening 18 by creating an interference fit with the notch member 20.

As set forth above, the easy release filter 10 may transition from an open mode to a closed mode by manipulating the tab member 19. FIGS. 3 and 4 illustrate the easy release filter 10 while in the "closed" position. As illustrated in FIG. 4, when force is applied to the tab member 19, the tab member 19 may overcome the holding force created by the notch members 20, and the tab member 19 may move to the opposite side of the opening 18. Because the tab member 19 can slide to either side of the opening 18, an operator may also have a visual representation as to whether the easy release filter 10 is in the open and closed position. As touch point 19 is manipulated into the secondary position in the opening 18, the corresponding addition of tension to spring 16 can cause spring 16 to bend or otherwise extend inwardly into the interior of portafilter 11. To return the easy release filter 10 to the open position, the operator may apply force to return the tab member 19 back to its original position in opening 18.

A filter basket used for brewing espresso or coffee may be placed in portafilter 11 when easy release filter 10 is in the open position. Once a filter basket has been placed in the portafilter 11, the easy release filter 10 may be placed in the closed position using the manner described above. When in the closed position, at least a portion of the spring 16 comes into contact with and applies a force to the exterior of the filter basket. The increased tension created by the spring 16 as it extends into the cavity 12 of the portafilter 11 can create an interference fit between the spring 16 and the filter basket, thereby locking the filter basket in place.

The interference fit is advantageous during the brewing process. For some operators, it may also be advantageous after the brewing process is complete, and it is time to remove grounds from the filter basket. When an operator taps or bangs the easy release filter 10 over a trash receptacle, the interference fit created by spring 16 reduces or eliminates the chance of a filter basket falling out of the portafilter 11 and into the trash receptacle. After the used coffee grounds have been removed from the filter basket or if an operator would like to remove the grounds from the filter basket with the filter basket removed from the portafilter 11, the easy release filter 10 can be ready for use again.

When the operator is ready to remove the filter basket for cleaning (or to remove coffee/espresso grounds therefrom), the operator may return the tab member 19 to the open position, causing the interference fit between the spring 16 and filter basket to cease. The operator may then remove the filter basket from the cavity 12 of the portafilter 11 for cleaning.

From the foregoing, it will be seen that this invention is one well adapted to attain all the ends and objects herein-above set forth together with other advantages which are inherent to the structure and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A portafilter for brewing a beverage, the portafilter comprising:
   a cavity in which a filter basket is configured to be releasably secured;
   a circumferential recessed groove defined in an interior of the portafilter;
   a spring retained in the circumferential recessed groove, the spring including a tab being located at a starting point of the spring and extending through an opening provided in the portafilter, wherein the tab is configured to be toggled from side to side in order to control tension in the spring;

wherein when the spring is in a first position, the filter basket is secured in the portafilter;
   wherein when the spring is in a second position, the filter basket is not secured in the portafilter; and
   wherein, when the spring is in the first position, the tab is retained in a tab first position via a first notch member positioned on a first side of the opening, and wherein, when the spring is in the second position, the tab is retained in a tab second position via a second notch member positioned on a second side of the opening.

2. The portafilter of claim 1, wherein the cavity includes a drip hole.

3. The portafilter of claim 1, wherein the spring includes a terminal point.

4. The portafilter of claim 1, wherein the portafilter includes a handle extending outwardly from the cavity.

5. The portafilter of claim 1, wherein in the first position, the spring extends at least partially radially into the cavity from the circumferential recessed groove.

6. The portafilter of claim 1, wherein in the second position, the spring is positioned entirely within the circumferential recessed groove without extending into the cavity.

7. A portafilter for use with a filter basket of a brewing machine, the portafilter comprising:
   a cavity in which the filter basket is received when the filter basket is in use;
   a circumferential recessed groove defined in an interior of the portafilter; and
   a spring retained in the circumferential recessed groove, the spring including a tab being located at a starting point of the spring and extending through an opening provided in the portafilter, wherein the tab is configured to be toggled from side to side in order to control tension in the spring;
   wherein the spring is controllable such that:
      in a first position the spring abuts the filter basket so as to secure the filter basket within the portafilter;
      in a second position the spring does not abut the filter basket such that the filter basket is not secured within the portafilter;
      when the spring is in the first position, the tab is retained in a tab first position via a first notch member positioned on a first side of the opening; and
      when the spring is in the second position, the tab is retained in a tab second position via a second notch member positioned on a second side of the opening.

8. The portafilter of claim 7, wherein the cavity includes a drip hole.

9. The portafilter of claim 7, wherein the spring includes a terminal point.

10. The portafilter of claim 7, wherein the portafilter includes a handle extending outwardly from the cavity.

* * * * *